US012561754B2

(12) United States Patent
Kim et al.

(10) Patent No.: US 12,561,754 B2
(45) Date of Patent: Feb. 24, 2026

(54) METHOD AND SYSTEM FOR PROCESSING IMAGE BASED ON WEIGHTED MULTIPLE KERNELS

(71) Applicants: SAMSUNG ELECTRONICS CO., LTD., Suwon-si (KR); Korea Advanced Institute Of Science And Technology, Daejeon (KR)

(72) Inventors: Daeshik Kim, Daejeon (KR); Wooyeong Cho, Daejeon (KR); Sanghyeok Son, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 372 days.

(21) Appl. No.: 17/929,186

(22) Filed: Sep. 1, 2022

(65) Prior Publication Data

US 2023/0073175 A1    Mar. 9, 2023

Related U.S. Application Data

(60) Provisional application No. 63/240,546, filed on Sep. 3, 2021.

(30) Foreign Application Priority Data

Nov. 2, 2021    (KR) ........................ 10-2021-0149019

(51) Int. Cl.
*G06T 3/4046* (2024.01)
*G06N 3/045* (2023.01)
(Continued)

(52) U.S. Cl.
CPC ........... *G06T 3/4046* (2013.01); *G06N 3/045* (2023.01); *G06T 3/4053* (2013.01); *G06V 10/7715* (2022.01); *G06V 10/82* (2022.01)

(58) Field of Classification Search
CPC ....... G06T 3/4046; G06T 3/4053; G06T 3/40; G06T 3/4061; G06T 3/4069;
(Continued)

(56) References Cited

U.S. PATENT DOCUMENTS 10,803,378 B2    10/2020    Ren et al.
10,970,820 B2    4/2021    El-Khamy et al.
(Continued)

FOREIGN PATENT DOCUMENTS

KR        10-0898700        5/2009
KR    10-2018-0105556        9/2018
(Continued)

OTHER PUBLICATIONS

Mildenhall, Ben et al. "Burst Denoising with Kernel Prediction Networks", Mar. 29, 2018 [retrieved on Oct. 29, 2024], Proceedings of the IEEE Conference on Computer Vision and Pattern Recognition 2018 [online], pp. 2502-2510. Retrieved from arxiv: <URL: https://arxiv.org/abs/1712.02327>. (Year: 2018).*
(Continued)

*Primary Examiner* — Matthew C Bella
*Assistant Examiner* — Nicholas John Helco
(74) *Attorney, Agent, or Firm* — Morgan, Lewis & Bockius LLP

(57) ABSTRACT

Systems and methods for processing a plurality of images include obtaining input data including the plurality of images; providing the input data to a first machine learning model; providing an output of the first machine learning model to a second machine learning model and a third machine learning model; generating a first feature map corresponding to a plurality of kernels based on an output of the second machine learning model; generating a second feature map corresponding to a plurality of weights based on an output of the third machine learning model; generating a
(Continued)

predicted kernel based on a weighted sum of the plurality of kernels; and generating output data based on the input data and the predicted kernel.

20 Claims, 11 Drawing Sheets

(51) Int. Cl.
    *G06T 3/4053*     (2024.01)
    *G06V 10/77*     (2022.01)
    *G06V 10/82*     (2022.01)

(58) Field of Classification Search
    CPC ....... G06T 3/4076; G06T 3/4092; G06T 5/20;
        G06T 5/50; G06T 5/60; G06T 5/70;
        G06T 5/73; G06T 5/90; G06T 5/92;
        G06T 5/94; G06N 3/045; G06N 3/08;
        G06N 3/0464; G06N 20/10; G06N
        3/0475; G06V 10/7715; G06V 10/82;
        G06V 10/806; G06V 10/36; G06V 10/77;
        G06V 10/80; G06V 10/803; G06V
        10/809; G06V 10/811
    See application file for complete search history.

(56) References Cited

U.S. PATENT DOCUMENTS

| | | | |
|---|---|---|---|
| 11,024,009 B2 | 6/2021 | Shi et al. | |
| 11,030,724 B2 | 6/2021 | Cho et al. | |
| 11,055,819 B1 | 7/2021 | Singh et al. | |
| 11,204,976 B2 * | 12/2021 | Ross ................. | G06F 18/2137 |
| 11,669,939 B1 * | 6/2023 | Ferrés ...................... | G06T 5/60 |
| | | | 382/167 |
| 2018/0232883 A1 * | 8/2018 | Sethi ..................... | G06T 7/0014 |
| 2019/0304069 A1 * | 10/2019 | Vogels ................... | G06N 3/096 |
| 2019/0339456 A1 * | 11/2019 | Ruggles .................... | G06T 7/11 |
| 2020/0090305 A1 * | 3/2020 | El-Khamy ............ | G06T 3/4046 |
| 2020/0133989 A1 * | 4/2020 | Song ....................... | G06N 3/045 |
| 2021/0049474 A1 * | 2/2021 | Son ........................ | G06N 3/045 |
| 2021/0118095 A1 * | 4/2021 | Kim ..................... | G06V 10/764 |
| 2021/0150333 A1 * | 5/2021 | Perazzi .................. | G06N 20/10 |
| 2021/0166350 A1 | 6/2021 | Wang et al. | |
| 2021/0326750 A1 * | 10/2021 | Shah ....................... | G06N 20/00 |
| 2022/0321830 A1 * | 10/2022 | Niklaus ................... | G06N 3/09 |
| 2022/0392021 A1 * | 12/2022 | Sinha ..................... | G06V 20/46 |

FOREIGN PATENT DOCUMENTS

| | | |
|---|---|---|
| KR | 10-2059529 | 12/2019 |
| KR | 10-2021-0043933 | 4/2021 |
| KR | 10-2021-0059600 | 5/2021 |
| KR | 10-2254755 | 5/2021 |
| WO | 2020-252764 | 12/2020 |

OTHER PUBLICATIONS

Yang, Wenhan et al. "Deep Edge Guided Recurrent Residual Learning for Image Super-Resolution", Jul. 18, 2016 [retrieved on Oct. 8, 2024], IEEE Transactions on Image Processing [online], vol. 26, No. 12, pp. 5895-5907. Retrieved from IEEE Xplore: <URL : https://ieeexplore.ieee.org/document/8030140> <DOI: 10.1109/TIP. 2017.2750403>. (Year: 2016).*

Zhang, Bin et al. "Attention Mechanism Enhanced Kernel Prediction Networks for Denoising of Burst Images", Jan. 29, 2020 [retrieved on May 31, 2025], ICASSP 2020 [online], pp. 2083-2087. Retrieved from arxiv: <URL: https://arxiv.org/abs/1910.08313>. <DOI: https://doi.org/10.48550/arXiv.1910.08313>. (Year: 2020).*

Marinc, Talmaj et al. "Multi-Kernel Prediction Networks for Denoising of Burst Images", 2019 [retrieved on Oct. 7, 2024], 2019 IEEE International Conference on Image Processing [online], pp. 2404-2408. Retrieved from IEEE Xplore: <URL: https://ieeexplore.ieee. org/document/8803335>. <DOI: 10.1109/ICIP.2019.8803335>. (Year: 2019).*

Mildenhall, Ben et al. "Burst Denoising with Kernel Prediction Networks", Mar. 29, 2018 [retrieved on May 31, 2025], Proceedings of the IEEE Conference on Computer Vision and Pattern Recognition 2018 [online], pp. 2502-2510. Retrieved from arxiv: <URL: https://arxiv.org/abs/1712.02327>. <DOI: https://doi.org/10.48550/ arXiv.1712.02327>. (Year: 2018).*

Xia, Zhihao et al. "Basis Prediction Networks for Effective Burst Denoising with Large Kernels", Dec. 3, 2020 [retrieved on May 31, 2025], 2020 CVPR [online], pp. 11844-11853. Retrieved from arxiv: <URL: https://arxiv.org/abs/1912.04421>. <DOI: https://doi. org/10.48550/arXiv.1912.04421>. (Year: 2020).*

Luo, Ziwei et al. "EBSR: Feature Enhanced Burst Super-Resolution with Deformable Alignment", Sep. 1, 2021 [retrieved on Jun. 2, 2025], 2021 IEEE/CVF CVPRW [online], pp. 471-478. Retrieved from IEEE Xplore: <URL: https://ieeexplore.ieee.org/document/ 9522734>. <DOI: 10.1109/CVPRW53098.2021.00058>. (Year: 2021).*

Zhang, Bin et al. "Attention Mechanism Enhanced Kernel Prediction Networks for Denoising of Burst Images", Jan. 29, 2020, ICASSP 2020 [online], pp. 2083-2087. Retrieved from arxiv: <URL: https://arxiv.org/abs/1910.08313>. (Year: 2020).*

Marinc, Talmaj et al. "Multi-Kernel Prediction Networks for Denoising of Burst Images", 2019, 2019 IEEE International Conference on Image Processing [online], pp. 2404-2408. Retrieved from IEEE Xplore: <URL: https://ieeexplore.IEEE.org/document/8803335>. (Year: 2019).*

Mildenhall, Ben et al. "Burst Denoising with Kernel Prediction Networks", Mar. 29, 2018 [retrieved on May 31, 2025], Proceedings of the IEEE Conference on Computer Vision and Pattern Recognition 2018 [online], pp. 2502-2510. Retrieved from arxiv: <URL: https://arxiv.org/abs/1712.02327>. (Year: 2018).*

Talmaj Marinc, et al., "Multi-Kernel Prediction Networks for Denoising of Burst Images", In 2019 EEE International Conference on Image Processing (ICIP), pp. 2404-2408, IEEE, 2019.

Wooyeong Cho, et al., "Weighted Multi-Kernel Prediction Network for Burst Image Super-Resolution", 2021 IEEE/CVF Conference on Computer Vision and Pattern Recognition Workshops (CVPRW), Date of Conference: Jun. 19-25, 2021, 13 pages.

* cited by examiner

: Convolution Layer

: Average Layer

: Bilinear Upsampling Layer

: Attention Module

DIN            K                DOUT

1

METHOD AND SYSTEM FOR PROCESSING IMAGE BASED ON WEIGHTED MULTIPLE KERNELS

CROSS-REFERENCE TO RELATED APPLICATIONS

This application claims the benefit of U.S. Provisional Application No. 63/240,546, filed on Sep. 3, 2021, in the US Patent Office and Korean Patent Application No. 10-2021-0149019, filed on Nov. 2, 2021, in the Korean Intellectual Property Office, the disclosures of which are incorporated by reference herein in their entireties.

BACKGROUND

The inventive concept relates to image processing, and more particularly, to methods and system for processing an image based on weighted multiple kernels.

Machine learning models may be used for image processing. For example, the machine learning model may be utilized to remove noise from the image or convert a low-resolution image to a high-resolution image. Accordingly, an image having low quality due to limited performance such as a camera module of a smartphone or a limited environment such as low illumination may be converted into a high-quality image by using a machine learning model.

SUMMARY

The inventive concept provides a method and system for processing an image to generate a high-quality image from a low-quality image based on weighted multiple kernels.

According to an aspect of the inventive concept, there is provided a method of processing a plurality of images, the method including obtaining input data including the plurality of images; providing the input data to a first machine learning model; providing an output of the first machine learning model to a second machine learning model and a third machine learning model; generating a first feature map corresponding to a plurality of kernels based on an output of the second machine learning model; generating a second feature map corresponding to a plurality of weights based on an output of the third machine learning model; generating a predicted kernel based on a weighted sum of the plurality of kernels; and generating output data based on the input data and the predicted kernel.

According to another aspect of the inventive concept, there is provided a system including at least one processor; and a non-transitory storage medium storing instructions allowing the at least one processor to perform image processing when the instructions are executed by the at least one processor, wherein the image processing may include obtaining input data including a plurality of images; providing the input data to a first machine learning model; providing an output of the first machine learning model to a second machine learning model and a third machine learning model; generating a first feature map corresponding to a plurality of kernels based on an output of the second machine learning model; generating a second feature map corresponding to a plurality of weights based on an output of the third machine learning model; generating a predicted kernel based on a weighted sum of the plurality of kernels; and generating output data based on the input data and the predicted kernel.

According to another aspect of the inventive concept, there is provided a non-transitory computer-readable storage medium including instructions allowing at least one processor to perform an image processing when the instructions are executed by the at least one processor, wherein the image processing may include obtaining input data including a plurality of images; providing the input data to a first machine learning model; providing an output of the first machine learning model to a second machine learning model and a third machine learning model; generating a first feature map corresponding to a plurality of kernels based on an output of the second machine learning model; generating a second feature map corresponding to a plurality of weights based on an output of the third machine learning model; generating a predicted kernel based on a weighted sum of the plurality of kernels; and generating output data based on the input data and the predicted kernel.

BRIEF DESCRIPTION OF THE DRAWINGS

Embodiments of the Inventive Concept Will be More Clearly Understood from the Following Detailed Description Taken in Conjunction with the Accompanying Drawings in which:

FIG. 1 is a block diagram illustrating image processing according to an example embodiment;

FIG. 2 is a diagram illustrating image processing according to an example embodiment;

DETAILED DESCRIPTION

Figure 3:
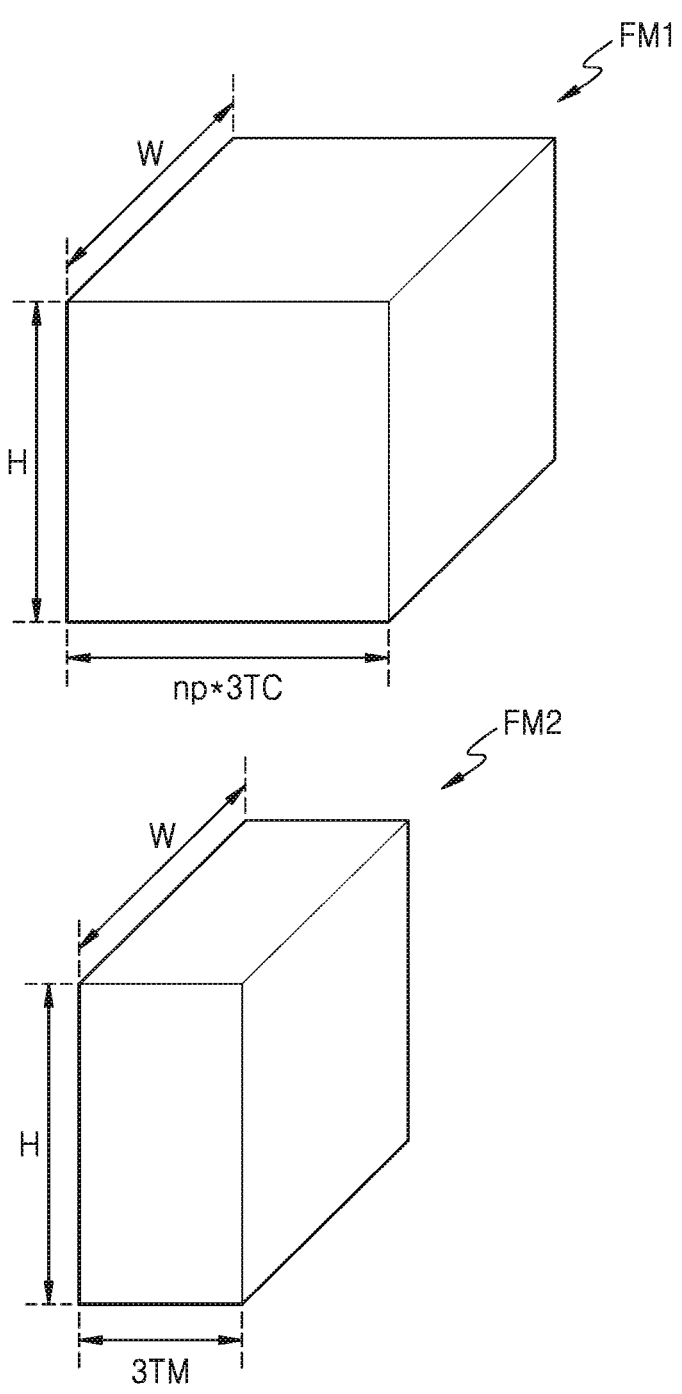
FIG. 3 is a diagram illustrating examples of a feature map according to an example embodiment.

The present disclosure relates to image processing. Embodiments of the disclosure include systems and methods for super-resolution imaging. Super-resolution imaging may refer to generating a high-resolution image from a low-resolution image. According to embodiments of the disclosure, super-resolution imaging based on deep learning may include predicting a multi-kernel and generating a high-resolution image from a low-resolution image based on the multi-kernel.

According to an embodiment of the inventive concept, two branches are formed in a network for kernel prediction. One branch is used for multi-kernel prediction, and the other branch is used for multi-kernel weight prediction. Input images are provided to a first model, and the output of the first model is provided to both a second model (i.e., the first branch) and a third model (i.e., the second branch). In some examples, the output of the first model may be reshaped for extraction of multi-kernel, and the output of the second model may be reshaped for extraction of weights. A weighted sum of the multi-kernel may be calculated based on the weights, and the kernel may be predicted. The predicted kernel may be applied to the input images, which may result in the generation of high-quality images. In some embodiments, the output images may be provided to a fourth model for super-resolution imaging. Due to the high-quality images provided to the fourth model, the super-resolution image may also have high quality.

Figure 1:
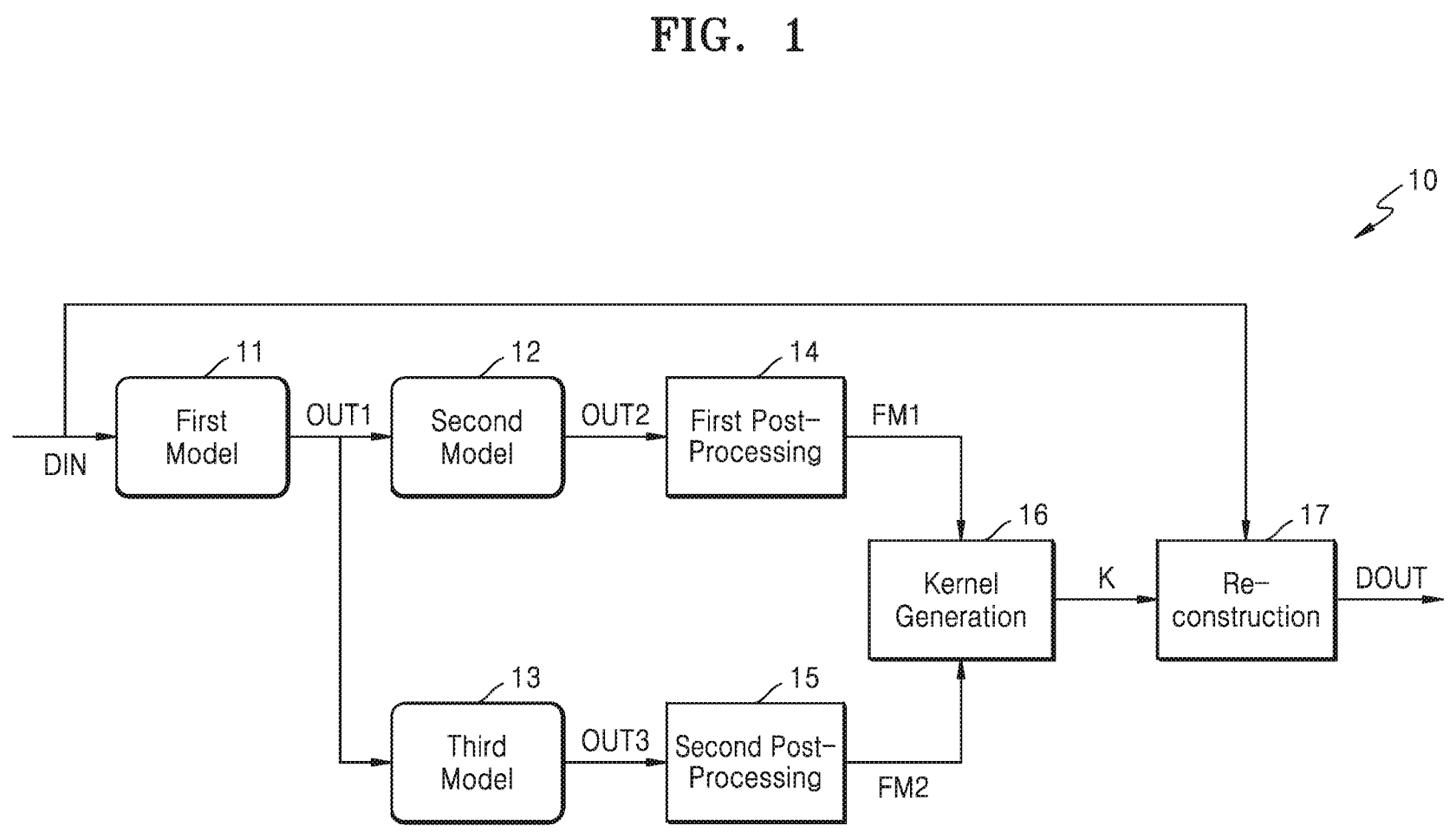

FIG. 1 is a block diagram illustrating image processing 10 according to an example embodiment. The image processing 10 may generate output data. DOUT including an image by processing input data DIN including an image. As shown in FIG. 1, the image processing 10 may include a first model 11, a second model 12, a third model 13, a first post-processing 14, a second post-processing 15, a kernel generation 16, and a reconstruction 17.

In some embodiments, the image processing 10 of FIG. 1 is performed by a computing system as described below with reference to FIGS. 10 and 11. For example, each of the blocks shown in FIG. 1 may correspond to hardware, software, or a combination of hardware and software included in the computing system. The hardware may include at least one of a programmable component such as a central processing unit (CPU), a digital signal processor (DSP), and a graphics processing unit (GPU), a reconfigurable component such as a field programmable gate array (FPGA), and a component providing a fixed function such as an intellectual property (IP) block. The software may include at least one of a set of instructions executable by a programmable component and code convertible into a series of instructions by a compiler or the like, and may be stored in a non-transitory storage medium.

Referring to FIG. 1, the first model 11 receives input data DIN and generate a first output OUT1 as a machine learning model. In some embodiments, the input data DIN may include a plurality of images, and the first model 11 may be trained to extract features from the plurality of images included in the input data DIN. Accordingly, the first output OUT1 generated by the first model 11 may correspond to a feature map for the plurality of images included in the input data DIN. An example of the first model 11 is described later with reference to FIG. 2.

Herein, a machine learning model may have any structure that is trainable. For example, the machine learning model may include an artificial neural network, a decision tree, a support vector machine, a Bayesian network, and/or a genetic algorithm, and the like.

An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Hereinafter, the machine learning model is described with reference to an artificial neural network, but example embodiments are not limited thereto. The artificial neural network may include, as a non-limiting example, a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, and the like. Herein, the machine learning model may be simply referred to as a model.

For example, the first model may include a CNN. A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. In some cases, the filter may be referred to as a kernel.

The second model 12 receives the first output OUT from the first model 11 and may generate a second output OUT2. The second model 12 may be trained to predict a kernel K that will be applied to the input data DIN in the reconstruction 17 to be described later. For example, the second model 12 may be trained to output a plurality of kernels of different sizes, as described below with reference to FIG. 4, and accordingly, the second output OUT2 may correspond to the plurality of kernels.

The third model 13 receives the first output OUT1 from the first model 11 and may generate a third output OUT3. The third model 13 may be trained to predict a kernel K that will be applied to the input data DIN in the reconstruction 17 to be described later. For example, the third model 13 may be trained to output a plurality of weights respectively corresponding to the plurality of kernels with different sizes, as described below with reference to FIG. 4, and accordingly, the third output OUT3 may correspond to the plurality of weights.

When the kernel is predicted based only on the second output OUT2 output by the second model 12, multiple kernels may be equally applied regardless of the position of the image. For example, an image may include a region having a high frequency and a region having a low frequency, and equally applying multiple kernels to the regions may limit the quality of a final image. On the other hand, the image processing 10 of FIG. 1 may include not only a signal processing path (which may be referred to as a first branch herein) including the second model 12 for kernel prediction, but also a signal processing path (which may be referred to as a second branch herein) including the third model 13 to reflect the importance of multiple kernels, and thus, the output data DOUT including the higher quality image from the input data DIN may be generated.

The first post-processing 14 generates a first feature map FM1 using the second output OUT2. For example, the first post-processing 14 may generate the first feature map FM1 by reshaping the second output OUT2 so that a plurality of kernels may be extracted in the kernel generation 16 to be described later. An example of the first feature map FM1 generated by the first post-processing 14 is described below with reference to FIG. 3.

The second post-processing 15 generates a second feature map FM2 using the third output OUT3. For example, the second post-processing 14 may generate the second feature map FM2 by reshaping the third output OUT3 so that a plurality of weights may be extracted in the kernel generation 16 to be described later. An example of the second feature map FM2 generated by the second post-processing 15 is described below with reference to FIG. 3.

The kernel generation 16 generates the kernel K from the first feature map FM1 and the second feature map FM2. As described above, the first feature map FM1 may correspond to the plurality of kernels, and the second feature map FM2 may correspond to the plurality of weights. The kernel generation 16 may identify respective importance levels of the plurality of kernels based on the plurality of weights, and may generate the kernel K from the plurality of kernels based on the identified importance levels. An example of the kernel generation 16 is described below with reference to FIG. 4.

The reconstruction 17 generates the output data DOUT from the input data DIN and the kernel K. As described above, the input data. DIN may include a plurality of images, and each of the plurality of images may be operated with the kernel K. The output data DOUT may include a plurality of images generated by applying the kernel K to the plurality of images, respectively. An image included in the output data DOUT may have a higher quality than an image included in the input data DIN. For example, the image included in the output data DOUT may correspond to an image in which noise is removed from the image included in the input data DIN, or may correspond to an image in which images included in the input data DIN are aligned.

Figure 2:
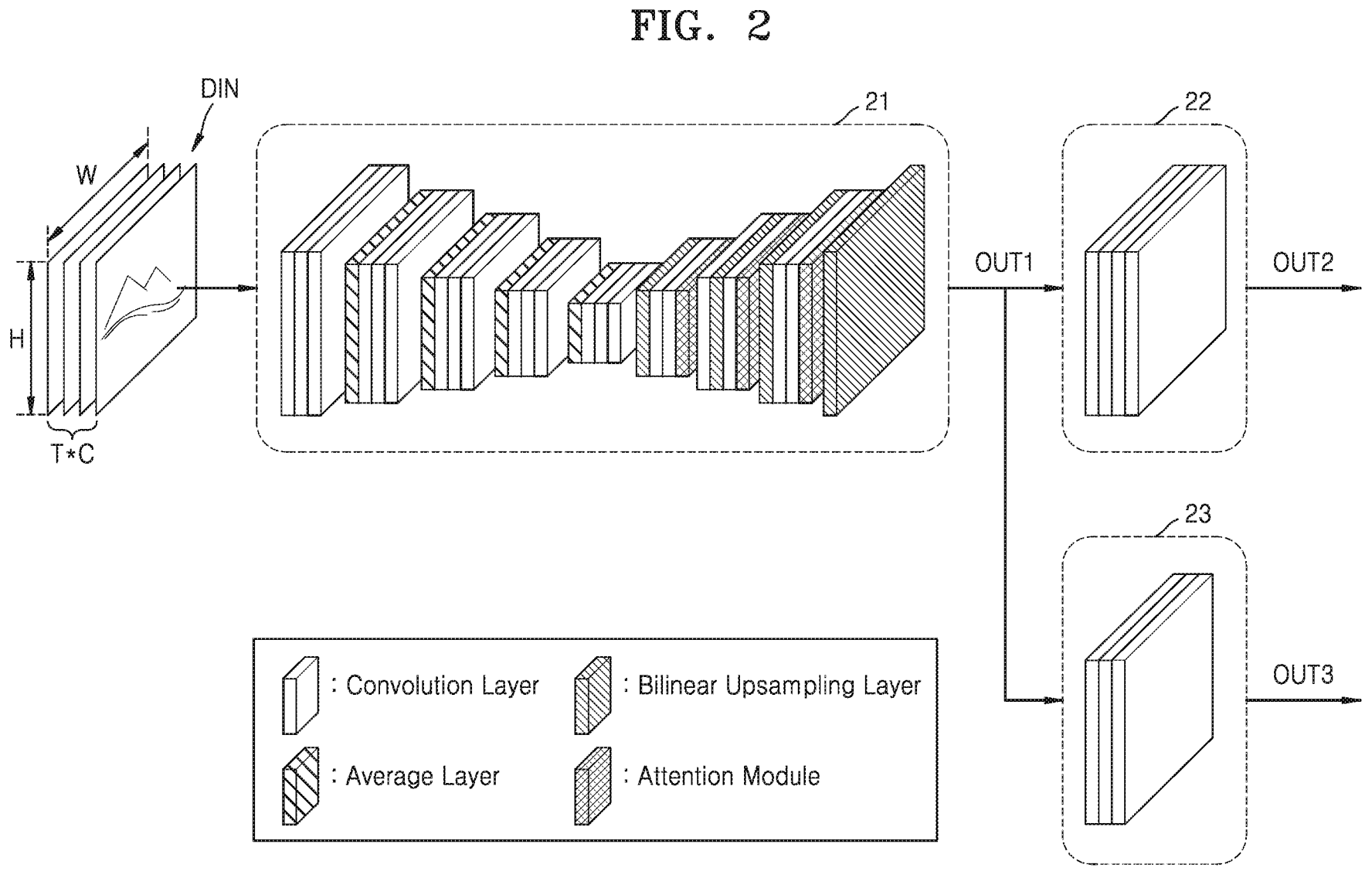

FIG. 2 is a diagram illustrating image processing according to an example embodiment. FIG. 2 shows examples of the first model 11, the second model 12, and the third model 13 of FIG. 1.

Referring to FIG. 2, input data DIN including a plurality of images is provided to a first model 21. For example, as shown in FIG. 2, the input data DIN may include T*C images each having a resolution of W*H. T may be the number of image frames each corresponding to one scene, and C may be the number of channels of the image frame. For example, C may be 3 when the image frame has an RGB format, while C may be 4 when the image frame has a Bayer format. A plurality of images in the input data DIN may be arranged such that pixels of the plurality of images overlap as shown in FIG. 2.

In some embodiments, the plurality of images included in the input data DIN may correspond to image frames generated by repeatedly photographing the same object. For example, in order to produce high-quality images despite limited perform lance such as the camera module of a smartphone, the same object may be repeatedly photographed, and a high-quality image frame may be generated based on the generated image frames. In some embodiments, the images included in the input data DIN may be images divided from a large-sized source image. For example, in order to reduce the complexity of image processing, a large-sized source image may be divided into a plurality of images, and the divided images may be provided to the first model 21.

In some embodiments, the first model 21 may be based on U-Net. The U-Net may be a fully convolution network of the end-to-end scheme. As shown in FIG. 2, the U-Net may include convolutional layers, bilinear upsampling layers, average layers, and attention layers. The first model 21, which is trained, may generate a first output OUT1 including features of a plurality of images included in the input data DIN, and as shown in FIG. 2, the first output OUT1 may be provided in common to a second model 22 and a third model 23.

The second model 22 may generate a second output OUT2 from the first output OUT1. As shown in FIG. 2, the second model 22 may include a plurality of convolution layers. Further, the third model 23 may generate a third output OUT3 from the first output OUT1. As shown in FIG. 2, the third model 23 may include a plurality of convolution layers. In some embodiments, the second model 22 for generating the second output OUT2 corresponding to the plurality of kernels from the first output OUT1 may include a greater number of convolutional layers than the third model 23 for generating a third output OUT3 corresponding to a plurality of weights from the first output OUT1. As described above with reference to FIG. 1, each of the second output OUT2 and the third output OUT3 may be post-processed, and may be respectively reshaped in the post-processing.

FIG. 3 is a diagram illustrating examples of a feature map according to an example embodiment. FIG. 3 shows examples of the first feature map FM1 and the second feature map FM2 of FIG. 1. As described above with reference to FIG. 1, the first feature map FM1 may be generated by post-processing the second output OUT2 of the second model 12 in the first branch, and the second feature map FM2 may be generated by post-processing the third output OUT3 of the third model 13 in the second branch. Hereinafter, FIG. 3 is described with reference to FIG. 1.

Referring to FIG. 3, the second output OUT2 of the second model 12 may be reshaped so that a plurality of kernels are extracted in the first post-processing 14 of FIG. 1. For example, as shown in FIG. 3, the first feature map FM1 may include np*3TC slices each having a resolution of W*H like an image included in the input data DIN. Here, n may be an integer greater than zero, 3 may mean that the final image has 3 channels (i.e., RGB), T may be the number of image frames, and C may be the number of channels. p may be the sum of sizes of the plurality of kernels. For example, as described below with reference to FIG. 4, when four kernels have sizes of 1, 3, 5, and 7, respectively, p may be 16 (p=1+3+5+7). Accordingly, kernels of different sizes may be extracted in the channel direction, for example, in the horizontal axis direction in FIG. 3.

Referring to FIG. 3, the third output OUT3 of the third model 13 may be reshaped so that a plurality of weights are extracted in the second post-processing 15 of FIG. 1. For example, as shown in FIG. 3, the second feature map FM2 may include 3TM slices each having a resolution of W*H like an age included in the input data DIN. Here, 3 may mean that the final image has three channels (i.e., RGB), T may be the number of image frames, and M may be the number of a plurality of kernels. For example, as described below with reference to FIG. 4, when a total of 4 kernels are used, M may be 4. Accordingly, weights respectively corresponding to the plurality of kernels may be extracted in the channel direction, for example, in the horizontal axis direction in FIG. 3.

Figure 4:
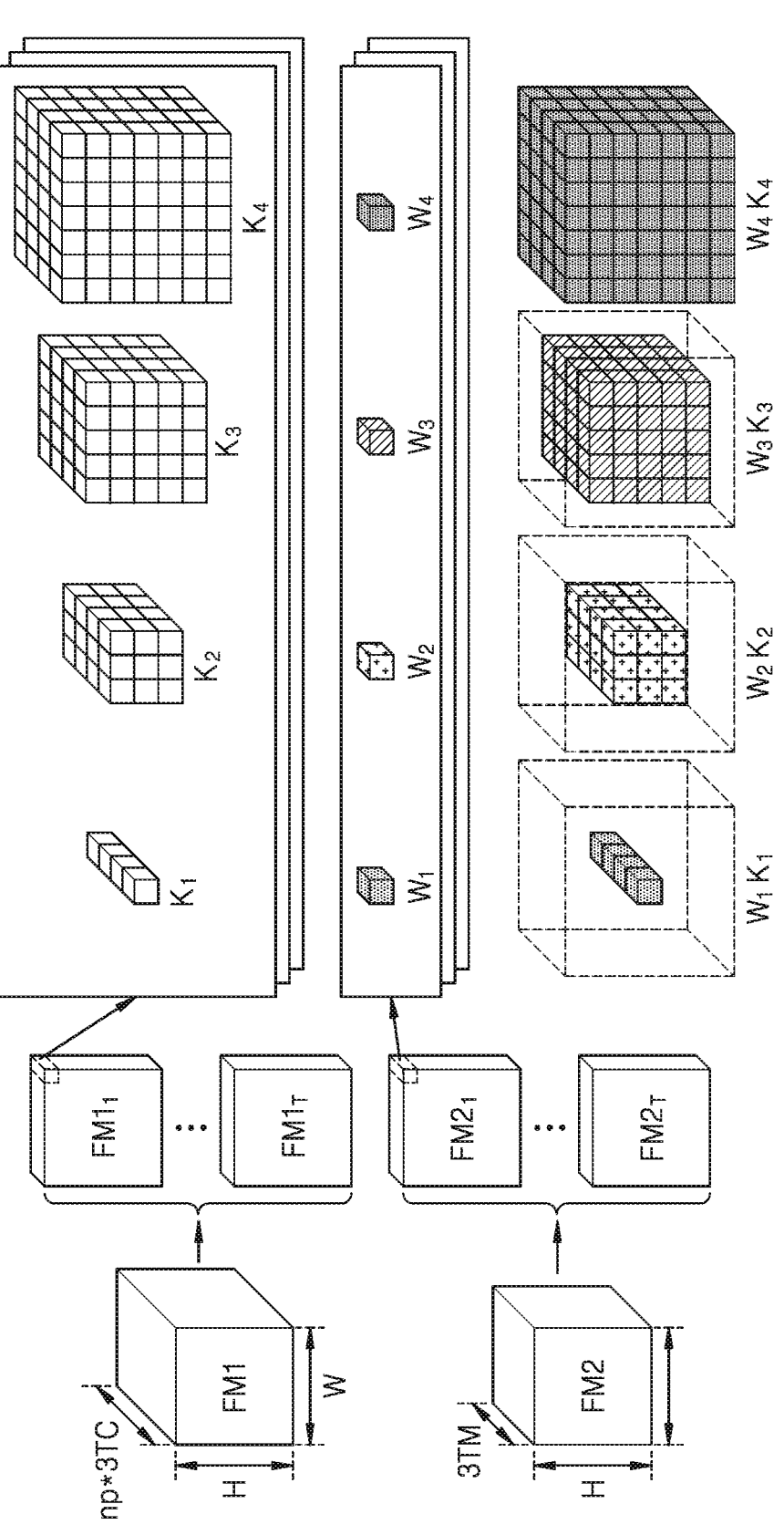
FIG. 4 is a diagram illustrating image processing according to an example embodiment.

FIG. 4 is a diagram illustrating image processing according to an example embodiment. FIG. 4 illustrates an example in which a kernel corresponding to one pixel is generated as an example of the kernel generation 16 of FIG. 1. As described above with reference to FIG. 1, the kernel K may be generated from the first feature map FM1 and the second feature map FM2 in the kernel generation 16.

As described above with reference to FIG. 3, the first feature map FM1 may include np*3TC slices each having a resolution of W*H. In FIG. 4, a total of four kernels each having a size of 1, 3, 5, and 7, for example, the first to fourth kernels $K_1$ to $K_4$, may be generated, and thus p may be 16. In addition, in the example of FIG. 4, the first feature map FM1 and the second feature map FM2 may be generated from input data DIN having a Bayer format (i.e., C=4), and accordingly, as shown in FIG. 4, the first to fourth kernels $K_1$ to $K_4$ may include four tensors in the channel direction.

In the kernel generation 16, the first feature map FM1 may be divided into T feature maps $FM1_1$ to $FM1_T$ in the channel direction. As shown in FIG. 4, the first to fourth kernels $K_1$ to $K_4$ may be e acted from a portion corresponding to one pixel in one divided feature map $FM1_1$. The first to fourth kernels $K_1$ to $K_4$ may be included in one kernel group, and three kernel groups corresponding to three channels (i.e., RGB) of the final image may be generated. A kernel $K_i^S$ generated from an input image $I_i$ may be expressed as in Equation 1 below.

$$K_i^S(x,y)=B_k(I_i(x, y))$$ [Equation 1]

In Equation 1, S is the kernel group, i is the image index, $B_k$ is a model for predicting a plurality of kernels, for example, a model including the first model 11 and the second model 12 in FIG. 1, and x and y may represent pixel coordinates.

As described above with reference to FIG. 3, the second feature map FM2 may include 3TM slices each having a resolution of W*H. As shown in FIG. 4, four kernels may be generated, so M may be 4. Similar to the first feature map FM1, in the kernel generation 16, the second feature map FM2 may be divided into T feature maps $FM2_1$ to $FM2_T$ in the channel direction. As shown in FIG. 4, first to fourth weights $w_1$ to $w_4$ may be extracted from a portion corresponding to one pixel in one divided feature map $FM2_1$. The first to fourth weights $w_1$ to $w_4$ may be included in one weight group, and three weight groups corresponding to the three channels (i.e., RGB) of the final image may be generated. A weight $w_i^S$ generated from the input image $I_i$ may be expressed as in Equation 2 below.

$$w_i^S(x,y)=B_w(I_i(x,y))$$ [Equation 2]

In Equation 2, S is the kernel group, i is the image index, $B_w$ is a model for predicting a plurality of weights, for example, a model including the first model 11 and the third model 13 of FIG. 1, and x and y may represent pixel coordinates.

In the kernel generation 16, a weighted sum of the plurality of kernels may be calculated based on the plurality of weights. For example, as shown in FIG. 4, the first kernel $K_1$ may be multiplied by the first weight $w_1$, the second kernel $K_2$ may be multiplied by the second weight $w_2$, the third kernel $K_3$ may be multiplied by the third weight $w_3$, and the fourth kernel $K_4$ may be multiplied by the fourth weight $w_4$.

In some embodiments, a softmax function may be applied to the weights extracted from the second feature map FM2. For example, the softmax function may be applied to the first to fourth weights $w_1$ to $w_4$ extracted from the feature map $FM2_1$, and the weights to which the softmax function is applied may be multiplied by the kernels. With softmax, important weights may be further emphasized. The weight $\tilde{W}_i$ to which the softmax is applied may be expressed as in Equation 3 below.

$$\tilde{W}_i = \frac{e^{w_i(x,y)}}{\sum_j e^{w_j(x,y)}}$$ [Equation 3]

In Equation 3, j is an index of a weight (or one kernel among a plurality of kernels).

The products of the kernel and the weight are summed, so that the final kernel may correspond to the weighted sum of the kernels. To sum products of different sizes, zero padding may be applied to products corresponding to a small size. For example, as shown by a dashed line in FIG. 4, zero may be added to the products $w_1K_1$, $w_2K_2$, and $w_3K_3$ to correspond to the product $w_4K_4$ having the largest size. The final kernel $\tilde{K}_i$ generated based on the weighted sum may be expressed as in Equation 4 below.

$$\tilde{K}_i(x, y) = \frac{1}{|S|}\sum_{s \in S} K_i^s(x, y) \cdot \tilde{W}_i^s(x, y)$$ [Equation 4]

Figure 5:
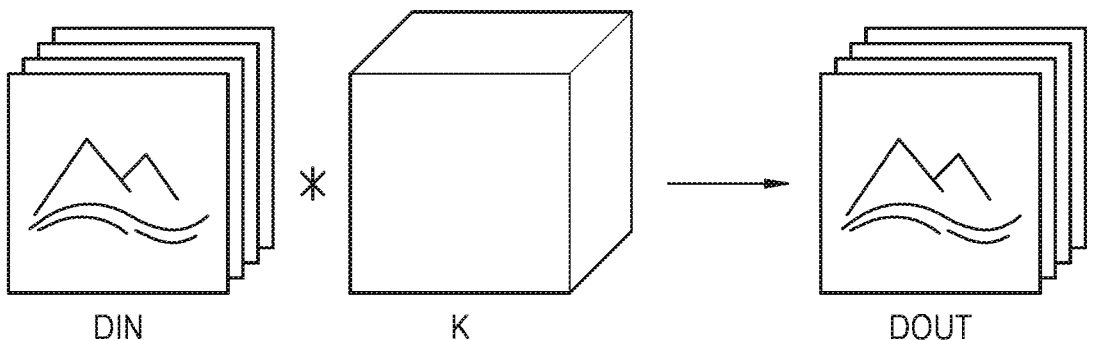
FIG. 5 is a diagram illustrating image processing according to an example embodiment.

FIG. 5 is a diagram illustrating image processing according to an example embodiment, FIG. 5 shows an example of the reconstruction 17 of FIG. 1. As described above with reference to FIG. 1, the output data DOUT may be generated by applying the kernel K generated through the kernel generation 16 to the input data DIN.

Referring to FIG. 5, convolution of the input data DIN with the kernel K is performed, and output data DOUT may be generated as a result of the convolution. As shown in FIG. 5, the input data DIN may include a plurality of images, and the output data DOUT may also include a plurality of images. As described above with reference to the drawings, the kernel K may be generated based on a plurality of kernels with different sizes and a plurality of weights respectively corresponding to the plurality of kernels. Accordingly, the kernel K may be more suitable for images included in the input data DIN and may generate the output data DOUT including images having higher quality. In some embodiments, images included in the output data DOUT may have reduced noise compared to images included in the input data DIN. Further, in some embodiments, when the images included in the input data DIN are generated by photographing the same object, the images included in the output data DOUT may be further aligned with each other. In some embodiments, as described below with reference to FIG. 6, the output data. DOUT including images having high quality may be used to generate a high-resolution image. Herein, the kernel K may be referred to as a predicted kernel.

Figure 6:
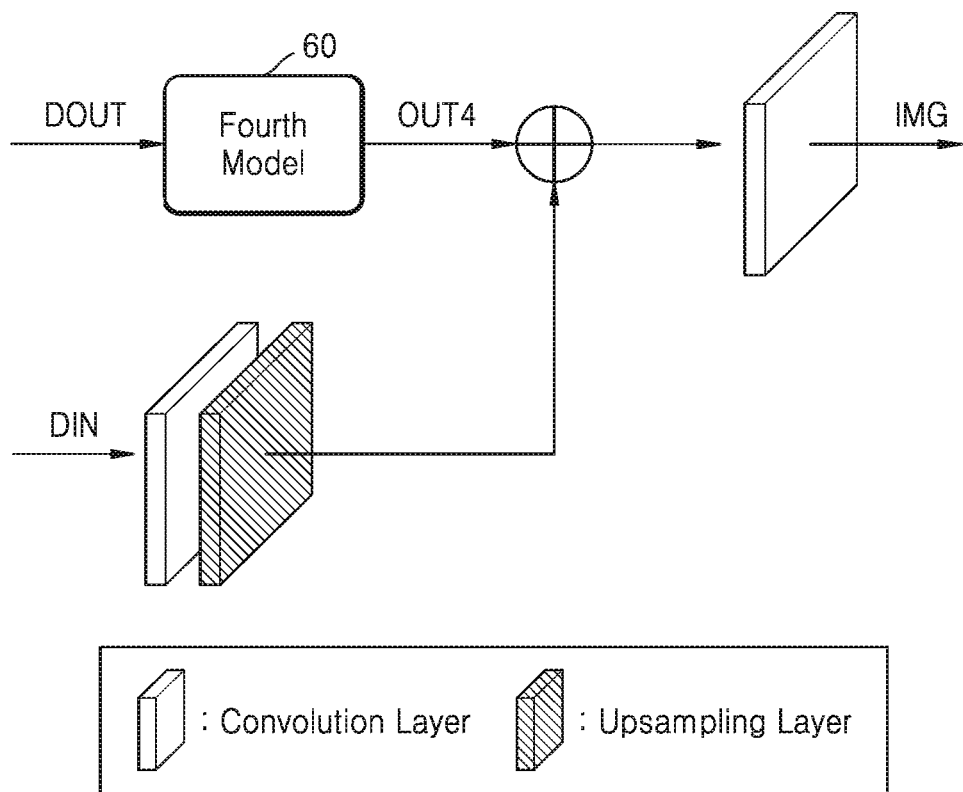
FIG. 6 is a diagram illustrating image processing according to an example embodiment.

FIG. 6 is a diagram illustrating image processing according to an example embodiment. FIG. 6 illustrates generating a high-resolution image IMG based on the output data DOUT of FIG. 1.

As high-resolution displays such as ultra-high definition (UHD) displays become popular, super resolution (SR) imaging that converts a low-resolution (LR) image such as a full-high definition (FHD) image into a high-resolution (HR) image may be used. A method based on a machine learning model such as deep learning may be used for the SR imaging, and output data DOUT of FIG. 1 may be used as an input for SR imaging.

When using deep learning models for super resolution, high complexity due to a deep network may require many resources, and the depth of the network and the performance of the network may not necessarily be proportional. In order to solve such a problem, residual learning may be used. The residual learning may refer to adding an LR image to an HR image and learning a difference value between two images. In some examples, the network may be divided into a plurality of residual blocks, and filter parameters may be more easily optimized by connecting each of the plurality of residual blocks through a skip connection. In some embodiments, a fourth model 60 of FIG. 6 may include the plurality of residual blocks.

Referring to FIG. 6, the fourth model 60 may receive the output data DOUT and generate the fourth output OUT4, thereby further improving the quality of the HR image IMG. As described above with reference to the drawings, the output data DOUT may include images of higher quality than images included in the input data DIN, and thus a better fourth output OUT4 may be generated by the fourth model 60. As shown in FIG. 6, the input data DIN may be processed by the convolution layer and the upsampling layer, and the processing result may be summed with the fourth output OUT4. The summation result may be processed by the convolution layer, and thus an HR image IMG may be generated. Herein, the HR image IMG may be referred to as an SR image.

Figure 7:
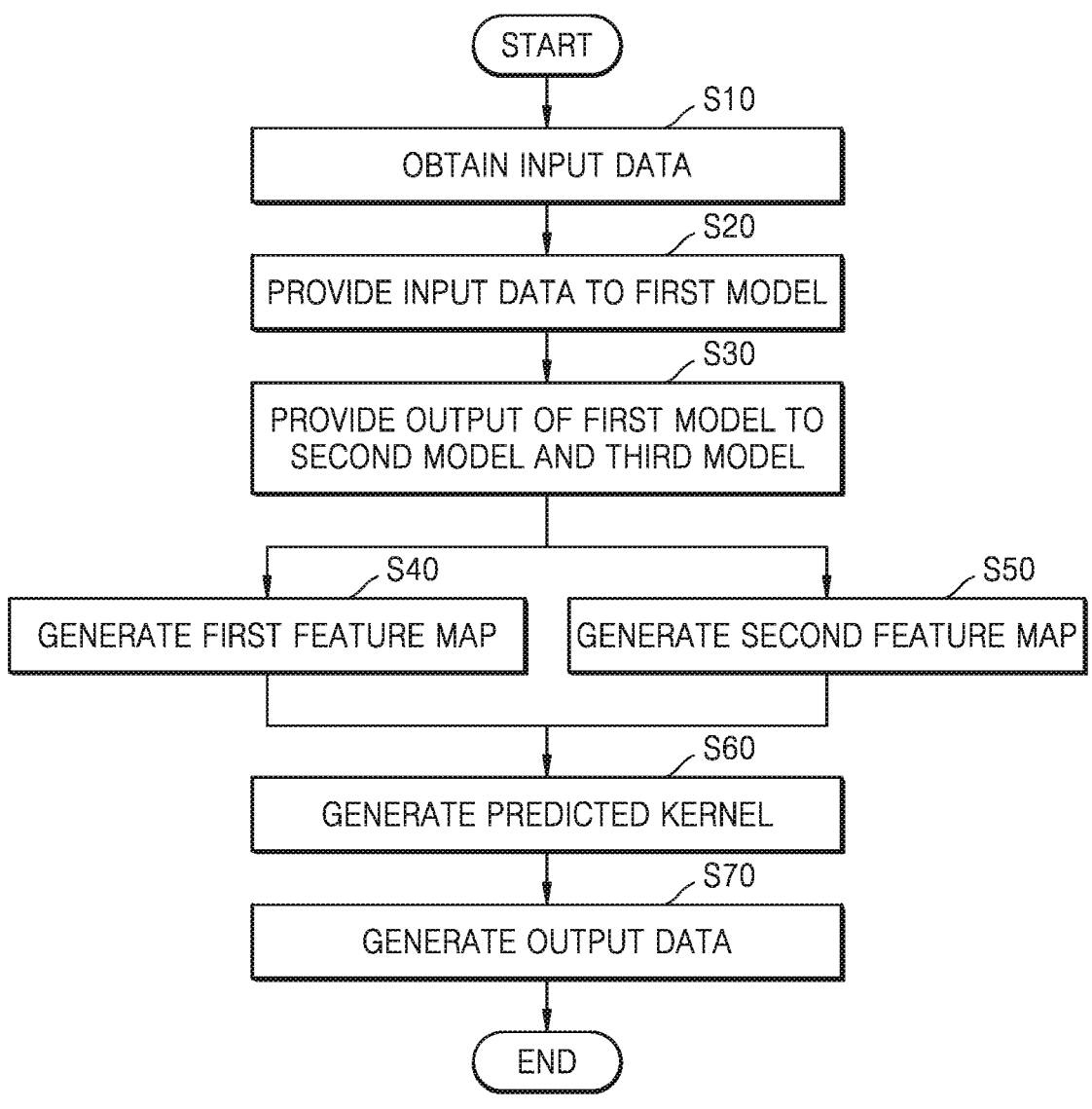
FIG. 7 is a flowchart illustrating a method of processing an image, according to an example embodiment.

FIG. 7 is a flowchart illustrating an image processing method according to an example embodiment. As shown in FIG. 7, the image processing method may include a plurality of operations S10 to S70. Hereinafter, FIG. 7 is described with reference to FIG. 1.

Referring to FIG. 7, in operation S10, the input data DIN is obtained. For example, by repeatedly photographing the same object, a plurality of images may be generated, and input data DIN including the plurality of images may be generated. A plurality of images in the input data DIN may be arranged such that pixels of the plurality of images overlap.

In operation S20, the input data DIN is provided to the first model 11. For example, the first model 11 may be based on U-Net and generate a first output OUT1 including features of a plurality of images included in the input data DIN by processing the input data DIN.

In operation S30, the output of the first model 11 is provided to the second model 12 and the third model 13. For example, the second model 12 may be trained to extract a plurality of kernels, and the third model 13 may be trained to extract a plurality of weights respectively corresponding to a plurality of kernels. The second model 12 and the third model 13 may receive the output of the first model 11, for example, the first output OUT1 in common, and may generate a second output OUT2 and a third output OUT3, respectively.

In operation S40, a first feature map FM1 is generated. For example, in operation S30, the second output OUT2 generated by the second model 12 may be reshaped to enable extraction of a plurality of kernels, and thus the first feature map FM1 may be generated. In some embodiments, the first feature map FM1 may be reshaped based on the number of image frames included in the input data DIN, the number of channels of the image, and sizes of the plurality of kernels.

For example, as described above with reference to FIG. 3, the first feature map FM1 may include np*3TC slices each having a resolution of W*H like an image included in the input data DIN.

In operation S50, the second feature map FM2 is generated. For example, in operation S30, the third output OUT3 generated by the third model 13 may be reshaped so that a plurality of weights may be extracted, and thus the second feature map FM2 may be generated. In some embodiments, the second feature map FM2 may be reshaped based on the number of image frames and the number of kernels included in the input data DIN. For example, the second feature map FM2 may include 3TM slices each having a resolution of W*H like an image included in the input data DIN.

In operation S60, a predicted kernel is generated. For example, a kernel may be generated based on the first feature map FM1 generated in operation S40 and the second feature map FM2 generated in operation S50. As described above with reference to the drawings, the predicted kernel may be generated based on a weighted sum of a plurality of kernels based on importance, and thus may be more suitable for the input data DIN. An example of operation S60 is described below with reference to FIG. 8.

In operation S70, output data DOUT is generated. The predicted kernel generated in operation S60 may be applied to the input data DIN, and thus the output data DIN may be generated. For example, as described above with reference to FIG. 5, a convolution operation between the input data DIN including the plurality of images and the kernel may be performed, and thus the output data DOUT including the plurality of images may be generated.

Figure 8:
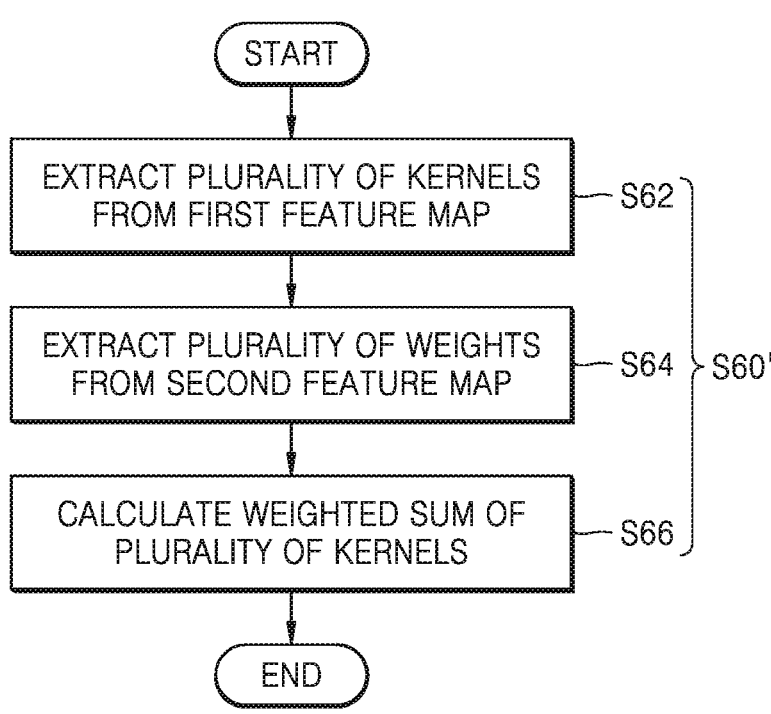
FIG. 8 is a flowchart illustrating a method of processing an image, according to an example embodiment.

FIG. 8 is a flowchart showing a method of processing an image according to an example embodiment. The flowchart of FIG. 8 shows an example of operation S60 of FIG. 7. As described above with reference to FIG. 7, in operation S60' of FIG. 8, a predicted kernel is generated. As shown in FIG. 8, operation S60' may include a plurality of operations S62, S64, and S66.

Referring to FIG. 8, in operation S62, a plurality of kernels are extracted from the first feature map FM1. For example, a plurality of kernels having different sizes may be extracted from the first feature map FM1. As described above with reference to FIG. 4, the first feature map FM1 may be reshaped based on the sum (i.e., p) of sizes of the plurality of kernels, and accordingly, the plurality of kernels may be easily extracted from the first feature map FM1.

In operation S64, a plurality of weights are extracted from the second feature map FM2. For example, a plurality of weights respectively corresponding to the plurality of kernels extracted in operation S62 may be extracted from the second feature map FM2. As described above with reference to FIG. 4, the second feature map FM2 may be reshaped based on the number of kernels (i.e., M), and accordingly, a plurality of weights may be easily extracted from the second feature map FM2. In some embodiments, the softmax function may be applied to the weights extracted from the second feature map FM2 in order to emphasize the importance of the kernel, and the weights to which the softmax function is applied may be used in operation S66 to be described later.

In operation S66, a weighted sum of the plurality of kernels is calculated. A weighted sum of the plurality of kernels extracted in operation S62 may be calculated based on the weights extracted in operation S64. For example, a product of the weight and the kernel may be generated, and a plurality of products may be summed. Due to the different sizes of the kernels, zero padding may be applied to the product corresponding to the kernel with a smaller size, as described above with reference to FIG. 4.

Figure 9:
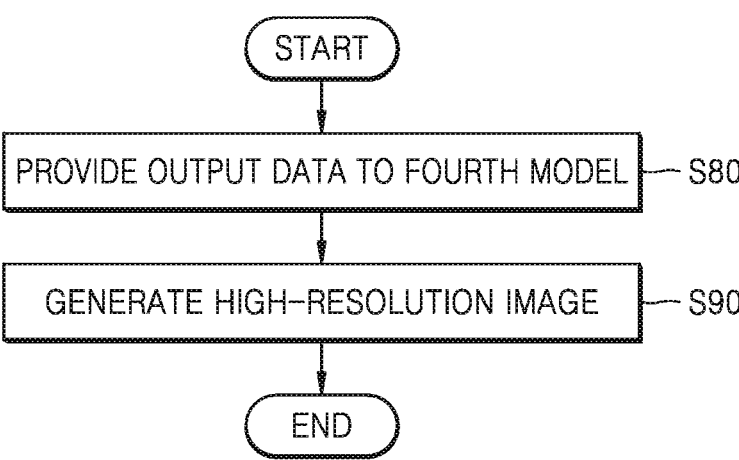
FIG. 9 is a flowchart illustrating an image processing method according to an example embodiment.

FIG. 9 is a flowchart illustrating an image processing method according to an example embodiment. The flowchart of FIG. 9 shows operations S80 and S90 that may follow operation S70 of FIG. 7. In some embodiments, as described above with reference to FIG. 6, output data DOUT generated using a kernel predicted based on a weighted sum of multiple kernels may be used for SR imaging. Hereinafter, FIG. 9 is described with reference to FIG. 6.

Referring to FIG. 9, in operation S80, the output data DOUT is provided to the fourth model 60. As described above with reference to FIG. 6, the fourth model 60 may be trained based on residual learning and may include a plurality of residual blocks. The trained fourth model 60 may generate a fourth output OUT4 from the output data DOUT.

In operation S90, an HR image IMG is generated. For example, the input data DIN may be processed by the convolution layer and the upsampling layer, and the processing result may be summed with the fourth output OUT4 generated in operation S80. The summation result may be processed again by the convolution layer, and thus an HR image MG may be generated. Due to the improved quality of the output data DOUT, the quality of the HR image IMG may also have improved quality.

In some embodiments, loss functions used to train the fourth model 60 of FIG. 9 and the first to third models 11 to 13 of FIG. 1 are defined based on the HR image IMG. For example, $L_1$ loss may be used, and the $L_1$ loss may be defined as in Equation 5 below.

$$L_{SR} = \frac{1}{N} \sum_{i=1}^{N} \left\| H_{SR}\left(\{b_j\}_{j=1}^{T}\right) - I_{HR}^i \right\|_1 \qquad \text{[Equation 5]}$$

In Equation 5, $H_{SR}$ may correspond to all the models described above.

Also, a structural similarity index measure (SSIM) loss may be used, and the SSIM loss may be defined as in Equation 6 below based on the dependence of the mean and standard deviation for a pixel p in a region P.

$$L_{SSIM}(P) = \frac{1}{N} \sum_{p \in P} 1 - SSIM(p) \qquad \text{[Equation 6]}$$

Models may be trained considering both the loss of Equation 5 and the loss of Equation 6, and accordingly, the loss function of Equation 7 below may be defined.

$$L_{Total} = \lambda_{SR} \cdot L_{SR} + \lambda_{SSIM} \cdot L_{SSIM} \qquad \text{[Equation 7]}$$

In Equation 7, $\lambda_{SR}$ and $\lambda_{SSIM}$ are coefficients determined based on a balanced learning method between consistency and visual quality. In some examples, parameters of one or more machine learning models are updated iteratively to minimize the loss function of equation 7.

Figure 10:
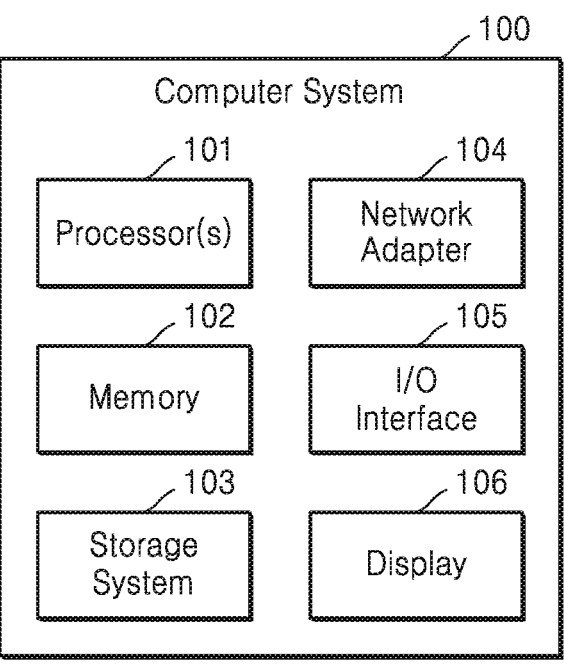
FIG. 10 is a block diagram illustrating a computer system according to an example embodiment.

FIG. 10 is a block diagram illustrating a computer system 100 according to an example embodiment. In some embodiments, the computer system 100 of FIG. 10 may perform image processing or training of models described above with reference to the drawings, and may be referred to as an image processing system or a training system.

The computer system 100 may refer to any system, including general-purpose or special-purpose computing systems. For example, the computer system 100 may include personal computers, server computers, laptop computers, consumer electronics, and the like. As shown in FIG. 10, the computer system 100 may include at least one processor 101, a memory 102, a storage system 103, a network adapter 104, an input/output interface 105, and a display 106.

The at least one processor 101 executes program modules including a computer system executable instructions. A program module may include routines, programs, objects, components, logic, data structures, etc. that perform particular operation or implement particular abstract data types. The memory 102 may include computer-readable recording medium in the form of volatile memory, such as random-access memory (RAM). At least one processor 101 may access the memory 102 and execute instructions loaded in the memory 102. The storage system 103 may store information in a non-volatile manner, and may include at least one program product including a program module configured to perform image processing and/or training of models described above with reference to the drawings in some embodiments. The program may include an operating system, at least one application, other program modules, and program data, as a non-limiting example.

The network adapter 104 provides connectivity to a local area network (LAN), a wide area network (WAN), and/or a public network (e.g., the Internet), and the like. The input/output interface 105 may provide a communication channel with a peripheral device, such as a keyboard, a pointing device, an audio system, or the like. The display 106 may output a variety of information that the user may verify.

In some embodiments, the image processing and/or training of models described above with reference to the drawings may be implemented as a computer program product. The computer program product may include a non-transitory computer-readable medium (or storage medium) including computer-readable program instructions for allowing the at least one processor 101 to perform image processing and/or training of models. Computer-readable instructions may be, as a non-limiting example, assembler instructions, instruction set architecture (ISA) instructions, machine instructions, machine dependent instructions, microcode, firmware instructions, state setting data, or source code or object code written in at least one programming language.

The computer-readable medium may be any tangible medium that may non-transitory maintain and store instructions executed by at least one processor 101 or any instruction-executable device. The computer-readable medium may be an electronic storage device, a magnetic storage device, an optical storage device, an electromagnetic storage device, a semiconductor storage device, or any combination thereof, but is not limited thereto. For example, the computer-readable medium may be a portable computer diskette, a hard disk, RAM, read-only memory (ROM), or electrically erasable read only memory (EEPROM), flash memory, static random-access memory (SRAM), a CD, a DVD, a memory stick, a floppy disk, a mechanically encoded device, such as a punch card, or any combination thereof.

Figure 11:
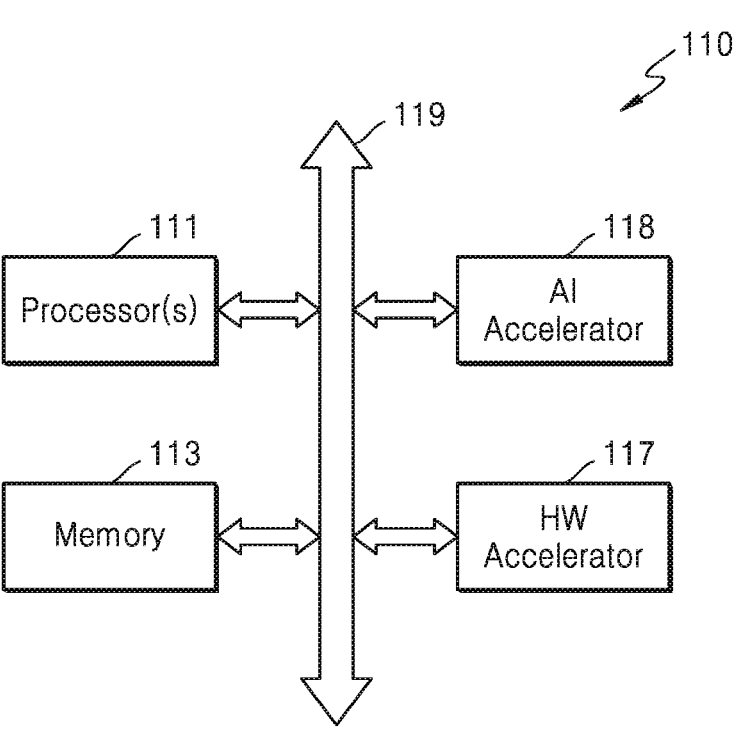
FIG. 11 is a block diagram illustrating an apparatus according to an example embodiment.

FIG. 11 is a block diagram illustrating an apparatus 110 according to an example embodiment. In some embodiments, image processing according to an exemplary embodiment is executed in the apparatus 110. Accordingly, the apparatus 110 may generate a high-quality output image from the input image, and may execute various applications utilizing the high-quality output image.

Referring to FIG. 11, the apparatus 110 may include at least one processor 111, a memory 113, an artificial intelligence (AI) accelerator 115, and a hardware accelerator 117, and the at least one processor 111, the memory 113, the AI accelerator 115, and the hardware accelerator 117 may communicate with each other through a bus 119. In some embodiments, the at least one processor 111, the memory 113, the AI accelerator 115, and the hardware accelerator 117 may be included in one semiconductor chip. Also, in some embodiments, at least two of the at least one processor 111, the memory 113, the AI accelerator 115, and the hardware accelerator 117 may be included in two or more semiconductor chips mounted on a board, respectively.

The at least one processor 111 may execute instructions. For example, the at least one processor 111 may execute an operating system by executing instructions stored in the memory 113, or may execute applications executed by the operating system. In some embodiments, the at least one processor 111 may instruct an operation to the AI accelerator 115 and/or the hardware accelerator 117 by executing instructions, and may obtain a result of performing the operation from the AI accelerator 115 and/or the hardware accelerator 117. In some embodiments, the at least one processor 111 may be an application specific instruction set processor (ASIP) customized for a specific purpose, and may support a dedicated instruction set.

The memory 113 may have any structure for storing data. For example, the memory 113 may include a volatile memory device such as DRAM, SRAM, or the like, and include a non-volatile memory device such as flash memory, resistive random-access memory (RRAM), or the like. The at least one processor 111, the AI accelerator 115, and the hardware accelerator 117 may store data (e.g., IN, IMG_I, IMG_O, OUT in FIG. 2) in the memory 113 through the bus 119, or may be read data (e.g., IN, IMG_I, IMG_O, and OUT in FIG. 2) from the memory 113.

The AI accelerator 115 may refer to hardware designed for AI applications. In some embodiments, the AI accelerator 115 may include a neural processing unit (NPU) for implementing a neuromorphic structure, may generate output data by processing input data provided from the at least one processor 111 and/or the hardware accelerator 117, and may provide output data to the at least one processor 111 and/or the hardware accelerator 117. In some embodiments, the AI accelerator 115 may be programmable and may be programmed by the at least one processor 111 and/or the hardware accelerator 117.

The hardware accelerator 117 may refer to hardware designed to perform a specific operation at a high speed. For example, the hardware accelerator 117 may be designed to perform data transformation such as demodulation, modulation, encoding, and decoding at a high speed. The hardware accelerator 117 may be programmable and may be programmed by at least one processor 111 and/or the hardware accelerator 117.

In some embodiments, the AI accelerator 115 executes the models described above with reference to the drawings. The AI accelerator 115 may generate an output that includes useful information by processing an image, a feature map, and the like. In addition, in some embodiments, at least some of the models executed by the AI accelerator 115 may be executed by the at least one processor 111 and/or the hardware accelerator 117.

While the inventive concept has been particularly shown and described with reference to embodiments thereof, it will be understood that various changes in form and details may be made therein without departing from the spirit and scope of the following claims.

What is claimed is:
1. A method of image processing, the method comprising:
  obtaining input data including a plurality of input images;
  providing the input data to a first machine learning model comprising a convolutional neural network (CNN);

providing an output of the first machine learning model to a second machine learning model and a third machine learning model;
  generating a first feature map corresponding to a plurality of kernels based on an output of the second machine learning model, wherein the first feature map has a first channel dimension comprising a first factor corresponding to a sum of a plurality of different kernel sizes of the plurality of kernels and a second factor corresponding to a number of input images;
  generating a second feature map corresponding to a plurality of weights based on an output of the third machine learning model, wherein the second feature map has a second channel dimension comprising the second factor corresponding to the number of input images;
  generating a predicted kernel by computing a weighted sum of the plurality of kernels having the plurality of different kernel sizes based on the first feature map and the second feature map; and
  generating output data in which the plurality of input images are denoised and aligned by applying a convolution layer to the input data based on the predicted kernel.

2. The method of claim 1, wherein the generating of the predicted kernel comprises:
  extracting the plurality of kernels from the first feature map, 7wherein the plurality of kernels has the plurality of different kernel sizes;
  extracting the plurality of weights respectively corresponding to the plurality of kernels from the second feature map; and
  calculating the weighted sum of the plurality of kernels based on the plurality of weights.

3. The method of claim 2, wherein the calculating of the weighted sum comprises:
  adding zero to a product of a weight and a second kernel that is different from a first kernel among the plurality of kernels, wherein the first kernel has a largest size among the plurality of different kernel sizes.

4. The method of claim 2, wherein the generating of the first feature map comprises:
  reshaping the output of the second machine learning model based on a number of the plurality of images, a number of channels in each of the plurality of images, and the plurality of different kernel sizes.

5. The method of claim 2, wherein the generating of the second feature map comprises:
  reshaping the output of the first machine learning model based on a number of the plurality of images and the number of kernels.

6. The method of claim 5, wherein the extracting of the plurality of weights comprises:
  applying a softmax function to the extracted weights.

7. The method of claim 1, wherein the obtaining of the input data comprises:
  generating the input data by arranging the plurality of images such that pixels of the plurality of images overlap.

8. The method of claim 1, wherein the first machine learning model comprises a U-Net convolution network.

9. The method of claim 1, wherein a number of layers included in the third machine learning model is less than the number of layers included in the second machine learning model.

10. The method of claim 1,
wherein the output data includes a plurality of output images which are are generated by performing a convolution operation on the input data with the predicted kernel.

11. The method of claim 1, further comprising:
providing the output data to a fourth machine learning model including a plurality of residual blocks; and
generating super-resolution image data in which the plurality of input images are denoised, aligned, and increased in resolution based on an output of the fourth machine learning model, wherein an upsampled sum is produced by summing the output of the fourth machine learning model with an output of an upsampling layer, and the upsampled sum is processed by a high-resolution convolution layer to produce the super-resolution image data.

12. A system comprising:
at least one processor; and
a non-transitory storage medium storing instructions allowing the at least one processor to perform image processing when the instructions are executed by the at least one processor, wherein the image processing comprises:
obtaining input data including a plurality of input images;
providing the input data to a first machine learning model comprising a convolutional neural network (CNN);
providing an output of the first machine learning model to a second machine learning model and a third machine learning model;
generating a first feature map corresponding to a plurality of kernels based on an output of the second machine learning model, wherein the first feature map has a first channel dimension comprising a first factor corresponding to a sum of a plurality of different kernel sizes of the plurality of kernels and a second factor corresponding to a number of input images;
generating a second feature map corresponding to a plurality of weights based on an output of the third machine learning model, wherein the second feature map has a second channel dimension comprising the second factor corresponding to the number of input images;
generating a predicted kernel by computing a weighted sum of the plurality of kernels having the plurality of different kernel sizes based on the first feature map and the second feature map; and
generating output data in which the plurality of input images are denoised and aligned by applying a convolution layer to the input data based on the predicted kernel.

13. The system of claim 12, wherein the generating of a predicted kernel comprises:
extracting the plurality of kernels from the first feature map, wherein the plurality of kernels has the plurality of different kernel sizes;
extracting the plurality of weights respectively corresponding to the plurality of kernels from the second feature map; and
calculating a weighted sum of the plurality of kernels based on the plurality of weights.

14. The system of claim 13, wherein the generating of the first feature map comprises:

reshaping the output of the second machine learning model based on a number of the plurality of images, a number of channels in each of the plurality of images, and the plurality of different kernel sizes.

15. The system of claim 13, wherein the input data includes a plurality of images, and the generating of the second feature map comprises:
reshaping the output of the first machine learning model based on a number of the plurality of images and the number of kernels.

16. The system of claim 13, wherein the extracting of the plurality of weights comprises:
applying a softmax function to the extracted weights.

17. The system of claim 12, wherein the image processing further comprises:
providing the output data to a fourth machine learning model including a plurality of residual blocks; and
generating super-resolution image data in which the plurality of input images are denoised, aligned, and increased in resolution based on an output of the fourth machine learning model, wherein an upsampled sum is produced by summing the output of the fourth machine learning model with an output of an upsampling layer, and the super-resolution image data is produced based on the upsampled sum.

18. A non-transitory computer-readable storage medium comprising instructions,
wherein the instructions allow at least one processor to perform image processing when the instructions are executed by the at least one processor, and
wherein the image processing comprises:
obtaining input data including a plurality of input images corresponding to image frames generated by repeatedly photographing the same object;
providing the input data to a first machine learning model comprising a convolutional neural network (CNN);
providing an output of the first machine learning model to a second machine learning model and a third machine learning model;
generating a first feature map corresponding to a plurality of kernels based on an output of the second machine learning model, wherein the first feature map has a first channel dimension comprising a first factor corresponding to a sum of a plurality of different kernel sizes of the plurality of kernels and a second factor corresponding to a number of input images;
generating a second feature map corresponding to a plurality of weights based on an output of the third machine learning model, wherein the second feature map has a second channel dimension comprising the second factor corresponding to the number of input images;
generating a predicted kernel by computing a weighted sum of the plurality of kernels having the plurality of different kernel sizes based on the first feature map and the second feature map; and
generating output data in which the plurality of input images are denoised and aligned by applying a convolution layer to the input data based on the predicted kernel.

19. The non-transitory computer-readable storage medium of claim 18, wherein the generating of the predicted kernel comprises:

extracting the plurality of kernels from the first feature map, wherein the plurality of kernels has the plurality of different kernel sizes;

extracting the plurality of weights respectively corresponding to the plurality of kernels from the second feature map; and calculating a weighted sum of the plurality of kernels based on the plurality of weights.

20. The non-transitory computer-readable storage medium of claim 18, wherein the generating of the first feature map comprises:

reshaping the output of the second machine learning model based on a number of the plurality of images, the number of channels in each of the plurality of images, and the plurality of different kernel sizes, and the generating of the second feature map includes reshaping the output of the first machine learning model based on a number of the plurality of images and the number of kernels.

\* \* \* \* \*